US008814236B2

(12) United States Patent
Kors et al.

(10) Patent No.: US 8,814,236 B2
(45) Date of Patent: Aug. 26, 2014

(54) VEHICLE CRASH GUSSET FOR REAR IMPACT

(71) Applicant: Toyota Motor Engineering & Manufacturing North America, Inc., Erlanger, KY (US)

(72) Inventors: Christopher M. Kors, Plymouth, MI (US); Palaniappan Palaniappan, Ann Arbor, MI (US); Sanjeev Gupta, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/659,481

(22) Filed: Oct. 24, 2012

(65) Prior Publication Data

US 2014/0110955 A1 Apr. 24, 2014

(51) Int. Cl.
*B60J 7/00* (2006.01)
(52) U.S. Cl.
USPC .................... 293/155; 293/133; 296/187.11

(58) Field of Classification Search
USPC ........... 296/187.11, 203.04, 193.08; 293/132, 293/133, 155
See application file for complete search history.

(56) References Cited

U.S. PATENT DOCUMENTS

| 4,950,031 | A | * | 8/1990 | Mizunaga et al. | ....... 296/187.11 |
| 6,059,331 | A | | 5/2000 | Mori | |
| 6,824,168 | B2 | | 11/2004 | Kawazu et al. | |

* cited by examiner

*Primary Examiner* — Joseph Pape
(74) *Attorney, Agent, or Firm* — Gifford, Krass, Sprinkle, Anderson & Citkowski, P.C.

(57) ABSTRACT

An example gusset for attaching a rear bumper assembly to a vehicle has a first attachment portion configured to attach to the bumper reinforcement bracket and the lower back panel of the vehicle, a second attachment portion configured to attach to the rear side member of the vehicle, and an angled portion presenting an oblique surface to a rear impactor to the vehicle. A pair of side portions are interconnected and spaced apart by the second attachment portion, and each side portion has an angled edge adjacent the angled portion.

18 Claims, 6 Drawing Sheets

VEHICLE CRASH GUSSET FOR REAR IMPACT

FIELD OF THE INVENTION

The invention relates to vehicle components, in particular to a vehicle component located near the rear of a vehicle.

BACKGROUND OF THE INVENTION

Rear-end impacts may cause great damage to a vehicle, and may cause injury to vehicle occupants. Improved configurations near the rear of the vehicle may improve vehicle safety, for example by increased crash energy absorption and/or avoiding over or under ride of vehicle bumper assemblies.

SUMMARY OF THE INVENTION

Examples of the present invention include a gusset that is configured to attach to the bumper reinforcement bracket (or bumper bracket), the lower back of the vehicle, and further to attach to the rear side member of the vehicle underbody. The gusset helps maintain attachment between the bumper reinforcement bracket, and hence a bumper assembly including the bumper reinforcement bracket, and the vehicle. In particular, direct mechanical attachment of the gusset to the rear side member of the vehicle helps retain the attachment of the bumper assembly to the vehicle during an impact.

In some examples, the gusset has an angled portion presenting an angled surface towards the rear of the vehicle. In some examples, the gusset is deformed so that the angled portion reorients to present a vertical surface during a rear impact to the vehicle. The vertical surface is then helpful in absorbing mechanical energy from the impact.

An example angle, relative to the vertical, for the angled portion of the gusset is 30 degrees from a vertical surface. In other examples, the angle may be 30°±30° degrees, i.e. from 0° (vertical) to 60°. In other examples, the angle may be between 10° to 60°, or more particularly an optimized range for the angle is 30°±10°, i.e. from 20° to 40°. In the case of zero degrees, the angled portion is vertical, and may alternatively be referred to as an extension portion extending downwardly from the attachment portion when the gusset is attached to a vehicle.

An example gusset comprises a first plate and a second plate. The plates may be formed of steel, and may be welded together, for example arc-welded together. In a representative example, the first plate is a bent plate including an angled portion and an attachment portion, and includes holes allowing attachment to the bumper reinforcement bracket and to the lower back of the vehicle. The second plate includes a pair of side portions bridged by a second attachment portion that attaches to the rear side member of the vehicle underbody.

In some examples, the first plate includes an angled portion providing an angled surface, located beneath a vertical attachment surface including one or more holes, such as a pair of holes, allowing attachment of the gusset to the bumper reinforcement bracket. Behind the first plate is welded a second plate having two side portions and a generally horizontal second attachment portion extending between the side portions. The side portions of the second plate may be generally triangular, tapering downwards, and attached to the angled portion of the first plate on the rear facing side of the second plate.

The gusset may also be formed from a single piece of metal, or otherwise assembled from component parts. In some examples, the gusset further includes a collar, the collar facilitating mounting of the gusset to the rear side member in cases where an exhaust hanger would otherwise impede attachment.

The additional attachment to the rear side member provided by the gusset helps keep the bumper reinforcement bracket attached to the lower back panel, for example during a rear impact. This also helps keep the bumper reinforcement itself attached to the lower back panel, helping to absorb energy during a rear impact. Further, the gusset helps keep the bumper structure of the impacting vehicle from riding over the bumper reinforcement of the subject vehicle, a condition known as over riding. The structure also helps prevent under riding, where the bumper structure of the impacting vehicle tends to ride under the bumper structure of the subject vehicle.

In some examples, the gusset includes an angled portion that presents an angled surface to the rear of the vehicle. In this context, an angled surface is one that is not horizontal or vertical when mounted on a vehicle in a normal configuration on a horizontal road. The angle between the angled surface and the vertical may be between 0° and 60°, such as between 10° and 60°, and more particularly between 20° to 40°, such as approximately 30°. In some examples the range limits are approximate. In some examples, the range limits are inclusive. In some examples, the range limits are exclusive.

In some examples, an impact of another vehicle (impactor) into the bumper creates a mechanical moment that tends to urge and reorient the angled surface towards a vertical orientation, as the bumper is collapsed by the impact. The reorientation of the gusset, and hence the angled surface, is facilitated by a first bend point in the rear side member. As the impacting structure crushes the bumper of the impacted vehicle, it then impacts the now-vertical rear surface of the gusset. It is advantageous for the impactor to encounter the vehicle gusset surface in a vertical orientation, as this facilitates energy absorption and reduces the chance of occupant injury. The impact with the gusset surface then induces a downwards bending of the rear side member around a second bend point in the side member.

DETAILED DESCRIPTION OF THE PREFERRED EMBODIMENTS

Figure 1A:
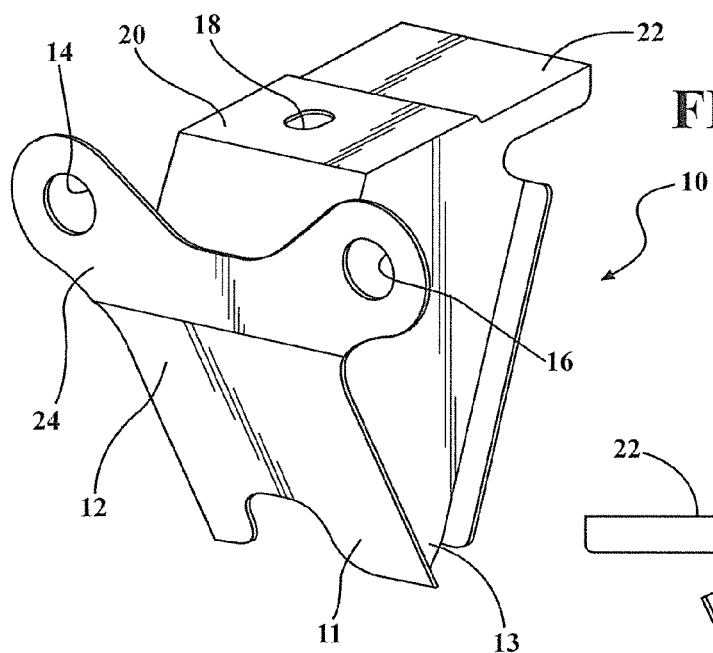
FIGS. 1A-1D show the gusset according to an example of the present invention.

Examples of the present invention include a gusset for use on the rear of a vehicle that maintains attachment of the bumper reinforcement bracket to the body and further promotes proper deformation of the rear side member during a rear impact by creating a reverse moment. The gusset may be made by welding two pieces of steel together to connect the bumper reinforcement bracket on the lower back panel to the rear side member of the vehicle. Keeping the bumper reinforcement bracket attached helps absorb energy during a crash and further helps prevent an impacting component (such as another bumper, or the barrier used in crash testing) from riding over the reinforcement.

An example gusset helps maintain the attachment of the bumper reinforcement bracket to the vehicle body by connecting to the rear side member of the underbody. The example gusset may also maintain the proper deformation mode of the rear side member 32 during rear impact by creating a reverse moment, which is designed to function even when height variations in the impacting structure (e.g. barrier used in a crash test, or front bumper of the impacting vehicle) and subject vehicle are considered. These height variations may occur from manufacturing variations between vehicles, suspension component variations, road irregularity effects, and the like.

An example gusset also has an angled surface which promotes proper bending of the side member in the event of a crash. In the case of an under-ride collision, the angled section of the gusset allows the impacting structure (e.g. barrier) to load the side member and trigger the first bend point before triggering the second bend point of the side member. Triggering a bend point means inducing a bend of the rear side member around the bend point. In the case of a normal or over-ride condition, the angled surface of the gusset catches the impactor (an impacting structure such as a barrier or front bumper of an impacting vehicle) and applies a reverse moment to the side member which in turn triggers the second bend point after the first bend point. In both of these collision situations the angled portion of the gusset helps ensure that the first and second bend points of the side member trigger sequentially.

An example gusset comprises a steel component, or two or more steel components welded together. One component may be a bent steel plate that attaches to the bumper reinforcement bracket and lower back of the vehicle, and presents the angled surface to a rear impactor. Another component may be a second plate formed and punched, welded to the first component and which attaches to the rear side member. Once attached, the gusset helps maintain an attachment between the underbody/rear side member and the bumper reinforcement bracket on the lower back panel. Additionally, as the presence of exhaust hangers may obstruct the direct mounting to some vehicles, a collar (such as a collar welded to the second plate) can be used to fill the gap between the second plate and rear side member once the gusset is attached.

An example gusset can be joined to the bumper reinforcement and rear side member of the vehicle in such a way that it creates a reverse moment during a rear impact and promotes a desired sequential triggering of various bend points throughout the rear side member.

Once the gusset is attached to the body, it keeps the bumper reinforcement bracket attached to the lower back panel by giving it an additional attachment to the rear side member on the underbody. Keeping the bumper reinforcement bracket attached also keeps the bumper reinforcement attached, which helps to absorb energy during the crash and prevent the impacting structure (e.g. barrier) from riding over the reinforcement.

FIGS. 1A-1D illustrate an example gusset 10 from various orientations. FIG. 1A shows a view of the gusset 10 including an angled portion 12, presenting an angled surface to the rear of the vehicle, and first attachment portion 24, including a pair of attachment holes 14 and 16. In this example, the angled portion 12 and attachment portion 24 are both provided by a first plate 11, having a bend angle between the angled portion 12 and attachment portion 24. The bend in the first plate 11 occurs between the generally vertical attachment portion 24 and the angled portion 12. Two attachment holes 14 and 16 are provided within the attachment portion 24 for attachment to the bumper reinforcement bracket and back panel of the vehicle (not shown).

A second plate 13 is welded (for example, arc-welded) to the first plate 11 and includes two side portions 26 and 28, a second attachment portion 20 extending between the two side portions 26 and 28, the second attachment portion 20 including a mounting hole 18 for attachment of the gusset 10 to a rear side member 32, and an extended top portion 22 extending from the second attachment portion 20.

Figure 1B:
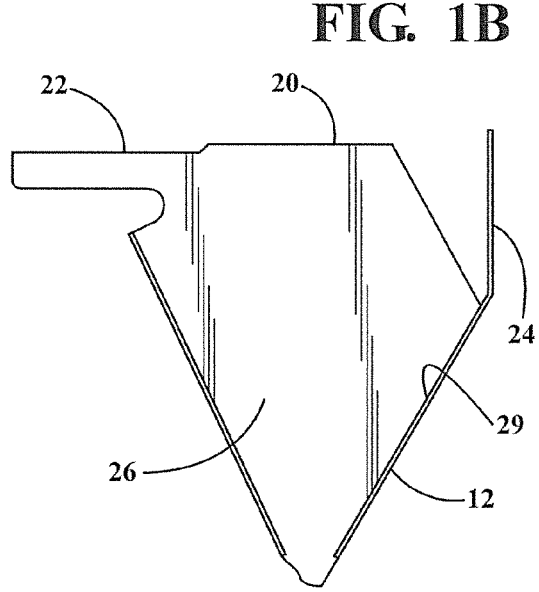

FIG. 1B illustrates the side profile of the side portion 26, extended top portion 22, first attachment portion (on the first plate, configured vertically) 24, second attachment portion 20. The angled portion 12 is adjacent the rear-facing angled edge of the side portion 26. FIG. 1B shows the side portion 26 as being tapered, with the narrow point directed downwards, and the rear-facing edge of the side portion 26 (to the right in this figure) is attached to the angle portion using a weld along the interface 29 between the angled portion 12 and the rear facing edge of the side portion 26. An arc weld extends between the angled portion 12 and the edge of the side portion 26 along interface 29. The other side portion 28 (not seen in this figure) is similarly configured.

Figure 1C:
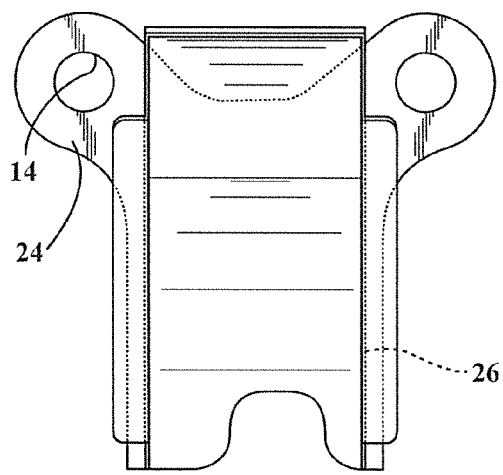

FIG. 1C illustrates another view of the gusset 10, including attachment portion 24 and attachment hole 14.

Figure 1D:
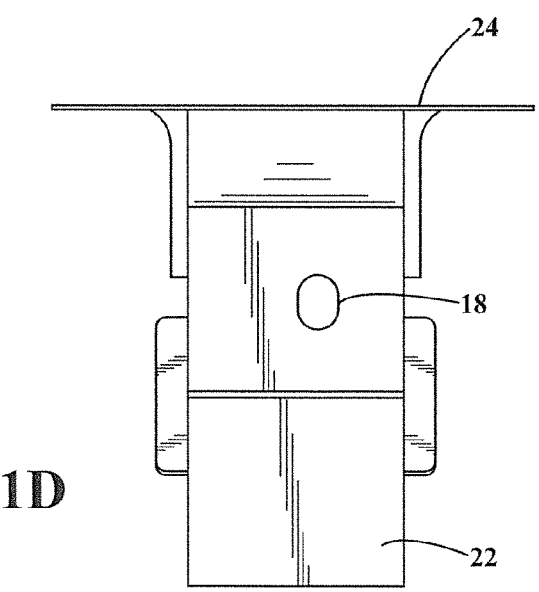

FIG. 1D is a top view of the gusset 10, including the mounting hole 18, extended top portion 22, and attachment portion 24.

Figure 2A:
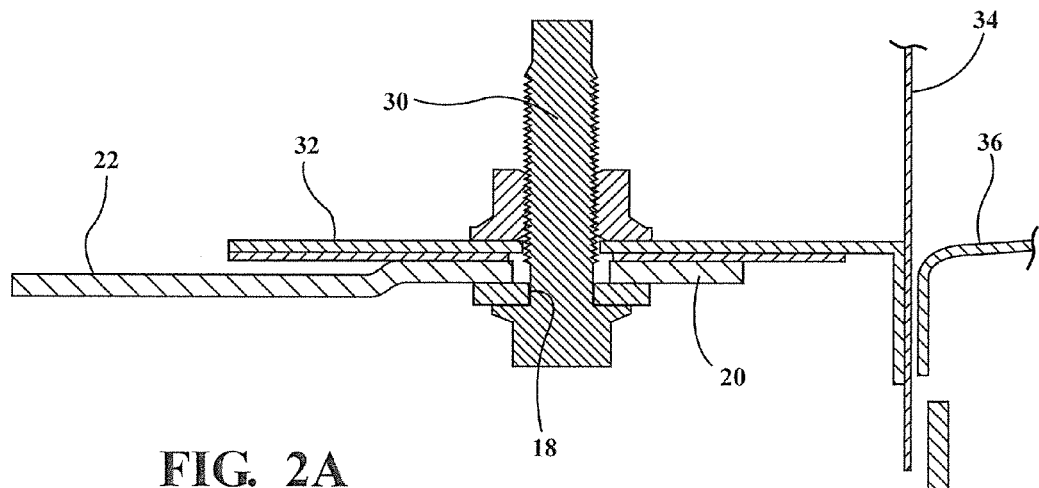
FIG. 2A is a side view showing presentation of an angled surface and attachment to the rear side member.

FIG. 2A is a side view in cross section through the center of the gusset 10. This cross section shows the angled portion 12 extending downwards. The side portions are not shown in this cross-section between the side portions. The figure shows an attachment 30 which attaches the gusset 10 to the rear side member 32, using mounting hole 18, and also shows the rear side member 32, the lower back panel 34, and the bumper reinforcement bracket 36 (in part).

Figure 2B:
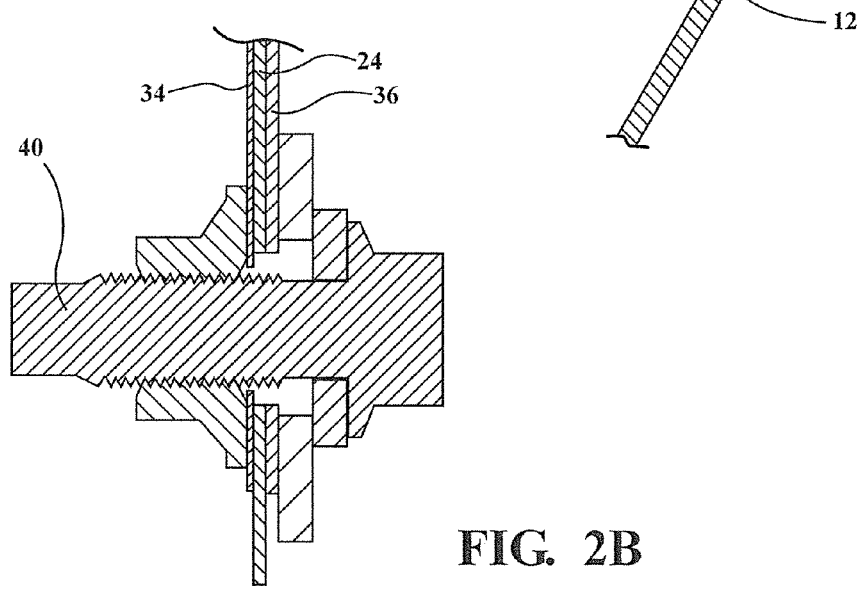
FIG. 2B illustrates attachment to the lower back panel.

FIG. 2B is a view in cross section of an attachment 40, attaching the bumper reinforcement bracket 36 to the first attachment portion 24 and to the lower back panel 34.

Figure 3A:
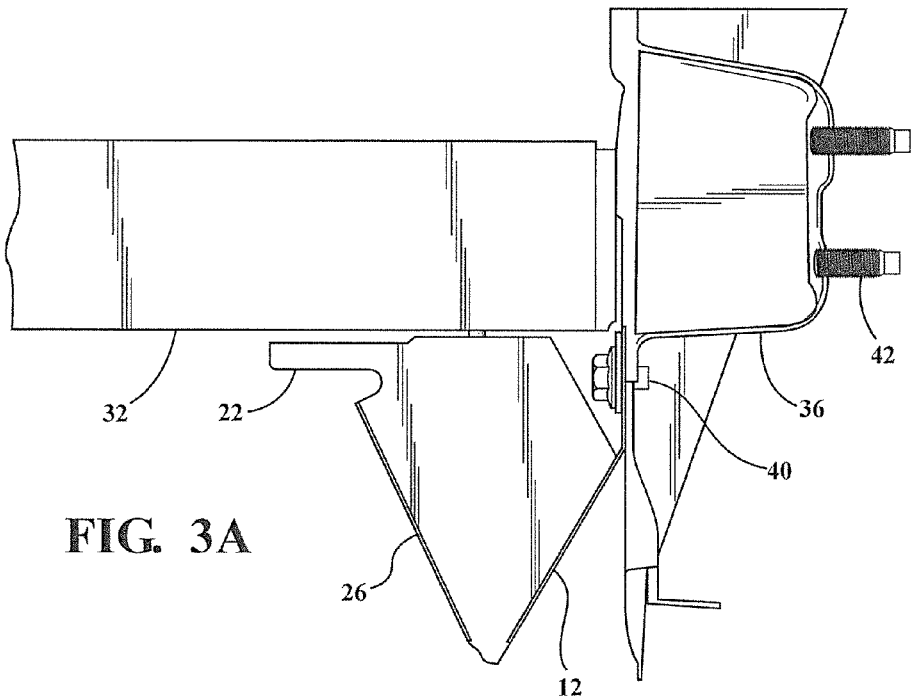
FIG. 3A is a right side view showing the side profile of the second plate and the rear side member.

FIG. 3A shows a side view, further illustrating the side profile of the side portion 26, which is attached to the angled portion 12. The figure also shows a portion of the rear side member 32, the bumper reinforcement bracket 36, and an attachment 42 for attaching a bumper reinforcement to the bumper reinforcement bracket 36. The bumper reinforcement (not shown) may support a bumper cover and extend between left and right bumper reinforcement brackets, associated with left and right gussets respectively.

Figure 3B:
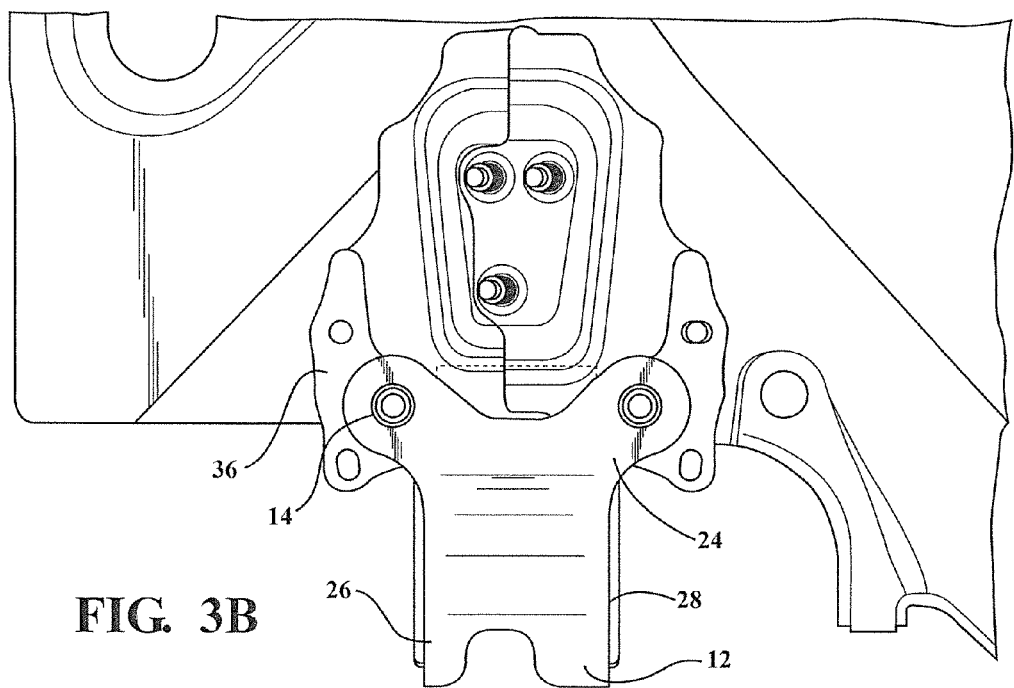
FIG. 3B is a rear view showing two downwardly extending side portions of the second plate being located behind the angled surface provided by the first plate.

FIG. 3B illustrates a rear view, showing the side portions 26 and 28, the first attachment portion 24, and the angled portion 12, and also part of the bumper reinforcement bracket 36. For illustrative clarity, parts of the bumper reinforcement bracket 36 that would cover the attachment portion 24 of the gusset 10 are omitted.

Figure 3C:
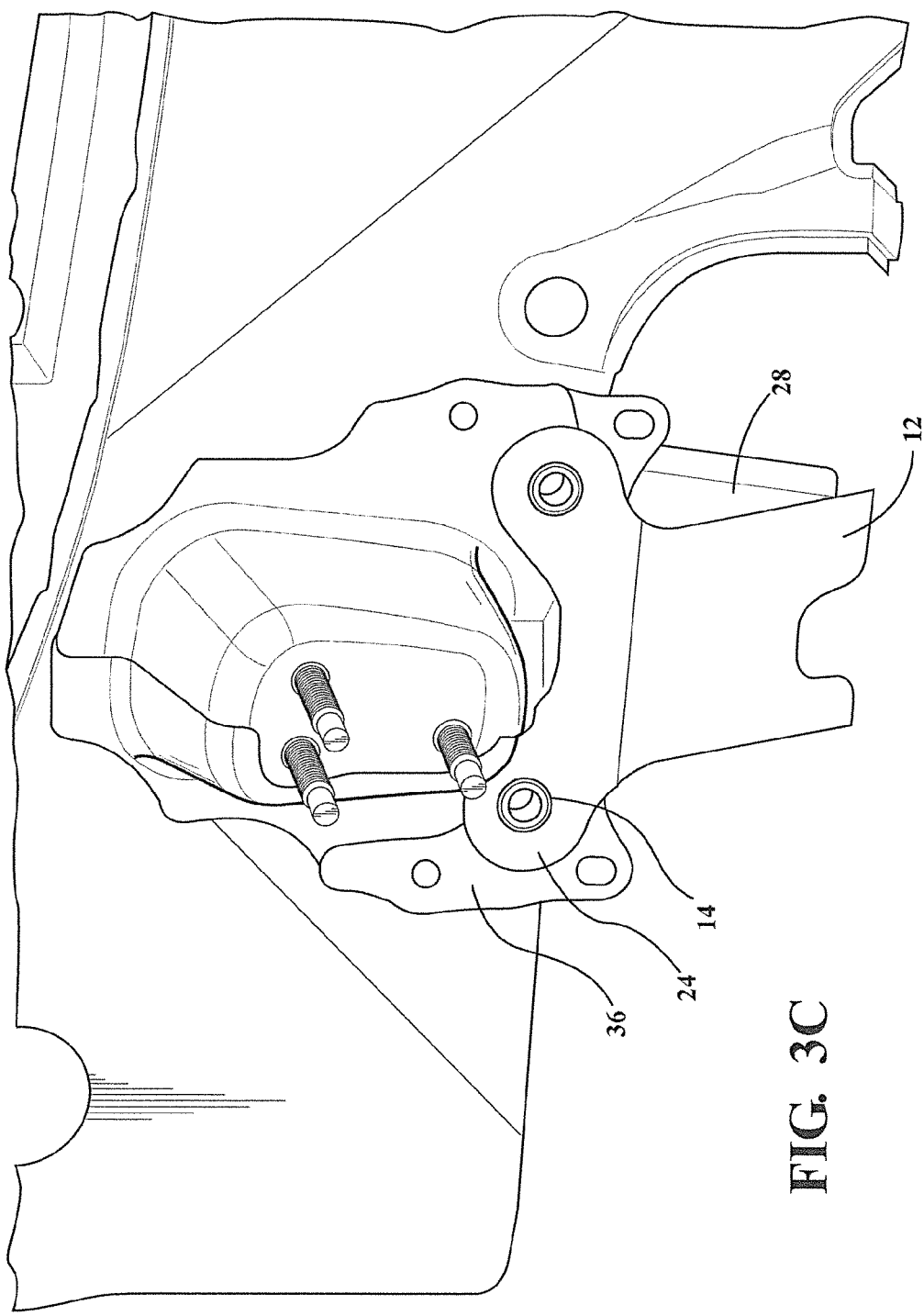
FIG. 3C is another view of the gusset.

FIG. 3C is an angled view, similar to FIG. 3B, showing the side portion 28. The side portions 26 and 28 each have a rear-facing angled edge that conforms to an adjacent surface of the angled portion 12. Side portion 28 is seen in this angled view. For clarity, parts of the bumper reinforcement bracket 36 that would cover the attachment portion 24 of the gusset 10 are omitted.

Figure 4:
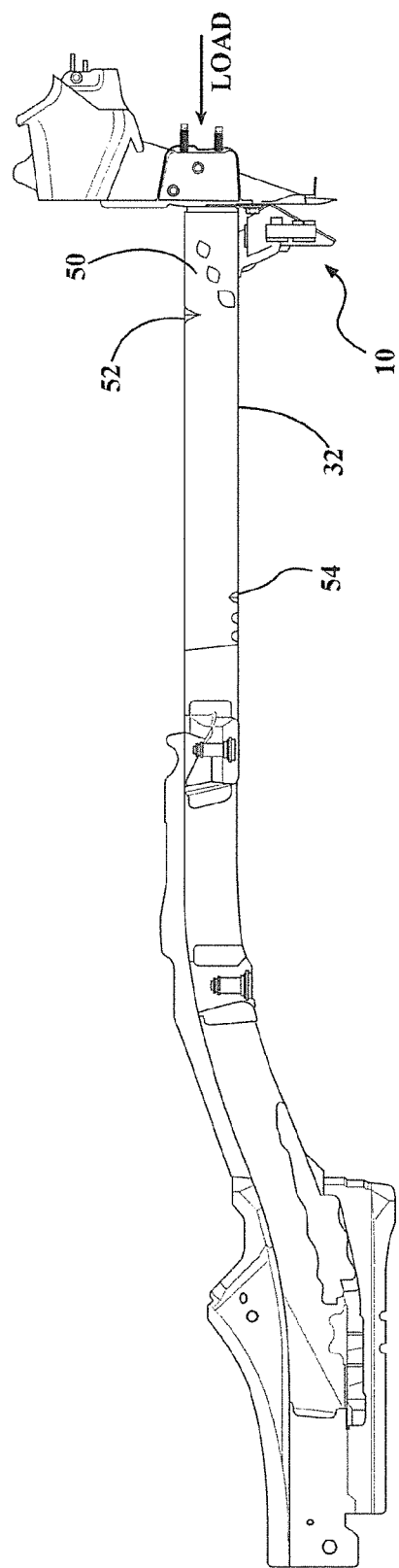
FIG. 4 is a side view showing the gusset attached to the rear side member, the rear side member having first and second bend points.

FIG. 4 is a side view of the rear side member 32 showing first and second bend points 52 and 54, respectively, within the rear side member 32. The rear side member 32 has a rear portion 50. The application of a load to the rear of the vehicle, indicated by the leftward pointing arrow on the right of the figure, tends to bend the rear portion 50 of the side member 32 upwards to present a vertical orientation of the angled portion 12 of the gusset 10 (shown in FIG. 1A) to the impacting load. This is facilitated by the first bend point 52 within the rear side member 32. When the load application point arrives at the gusset, further bending the rear side member 32 may occur around the second bend point 54. This configuration helps facilitate the absorption of energy by the rear side member 32, helping to prevent injury to vehicle occupants, and further helps to retain the bumper structure to the vehicle. This helps avoid the dangerous over riding or under riding conditions caused by mismatched distances of bumpers above the road for the impacting vehicles.

Figure 5:
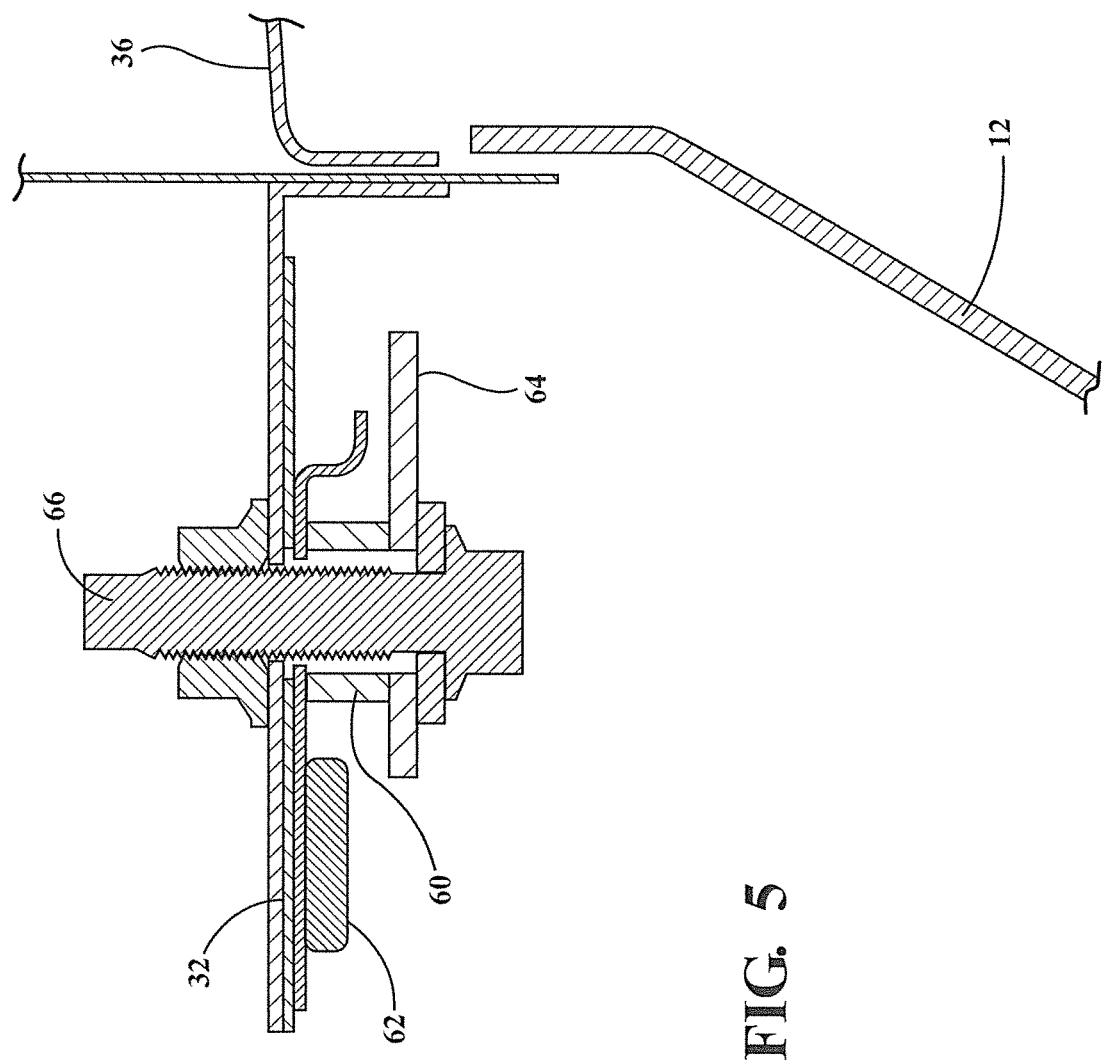
FIG. 5 shows an alternative configuration, in which a collar is added to facilitate mounting to the side member in the presence of an exhaust hanger.

FIG. 5 is a cross-sectional side view of an alternative configuration similar to that of FIG. 2A, but including an additional part, the collar 60 located between the attachment portion 64 (for attaching the gusset 10 to the rear side member 32, similar to the attachment portion 20 in FIG. 1A but located slightly lower) and the rear side member 32. This helps attach the gusset 10 to the rear side member 32 even when the exhaust hanger 62 would otherwise interfere with the attachment. The attachment itself is shown at 66 extending through the top portion 64 (analogous to element 20 of FIG. 2A), the collar 60, and a hole in the wall of the rear side member 32. As noted above, this configuration is analogous to that shown in FIG. 2A, the difference being the attachment of the collar 60 to the gusset 10. The collar may be welded directly to the attachment portion 64, or may be a separate component.

Hence, examples of the present invention include a gusset that is attached to the vehicle as a separate assembly from the exhaust hanger, even where the exhaust hanger is proximate the gusset.

Crash Safety Aspects

Vehicles may be crash tested using an impact between the vehicle and a moving barrier. For a rear impact, a barrier at a predetermined height above the road surface impacts the rear of the vehicle at a given speed. The barrier height may be varied to approximate real-life collisions where the bumper structure of an impacting vehicle may vary in height above the road. In some examples, the angled surface presented by the angled portion (for example, of a first plate) allows additional vehicle protection even when the barrier height is varied. In this context the reference to a barrier may refer to either the actual barrier used for collision testing, or the corresponding bumper assembly of an impacting vehicle.

An important aspect is the provision of an angled surface to a rear impactor. In this context, an angled surface is some angle from the vertical, for example between >0° and 60°, such as approximately 30°. The terms horizontal and vertical are used for clarity, and relate to orientations relative to a vehicle in a normal configuration on flat ground. The horizontal plane is a plane passing through the wheel centers, and the vertical direction is orthogonal to this.

In some examples, the first plate includes one or more (e.g. two) holes for attachment to the lower back panel and the bumper bracket. The second plate includes at least one hole for attachment to the rear side member. The provision of the second plate helps keep the bumper bracket attached to the lower back panel of the vehicle. This also helps keep the barrier engaged with the bumper structure, rather than deviating and impacting the vehicle at less strong portions above and below the bumper structure, sometimes referred to as riding, and including over-riding and under-riding conditions. Attachment of the gusset to the rear side member is an important aspect of avoiding this dangerous condition.

During a crash-test collision with a barrier, the barrier typically hits the rear of the bumper providing a load input to the first bend point of the rear side member 32. This may tend to bend the rear side member 32 at the first bend point and rotate the rear portion of the side member upwards, so that the rear angled face of the gusset 10 becomes generally vertical. Within a short time period, typically of the order of milliseconds, the barrier impact collapses the bumper and the barrier then directly impacts the now vertical flat surface of the gusset 10. This provides a new load force at the bottom angled portion of the gusset 10, whereas the initial load force was directed through the upper portion only. This slightly later load input now tends to bend the rear side member 32 downwards at the second bend point. In tests, a typical time period between the initial impact of the bumper structure and impact with the gusset 10 was around 12 milliseconds, though this is just an illustrative time and not limited. The vertical orientation of the rear face of the gusset 10 helps avoid the sliding of the barrier under the gusset 10. This helps keep the gusset 10 engaged with the impacting barrier.

The angled surface of the gusset is a useful aspect of example parts. For an under-ride condition (where the vehicle is higher from ground), the barrier contact to the gusset is delayed due to this angle. This allows the barrier to load the side member and trigger the first bend point prior to it contacting the gusset. After the first bend point is triggered and the barrier contacts the gusset, the load is then transferred through the gusset and side member, which then triggers the second bend point.

At a nominal or barrier over-ride condition (vehicle lower to ground), the large overhang of the bumper reinforcement combined with the relatively high barrier position may create a large moment input to the side member. In a conventional configuration, this high moment input can cause the side member to bend close to the second bend point without triggering the first bend point. However, by including a gusset according to examples of the present invention, the angled surface of the gusset can catch the barrier, applying a reverse moment to the side member. This reverse moment tends to cancel the large moment input to the side member, allowing the first bend point to trigger after the second bend point. The gusset angle may be adjusted, allowing the gusset to function as described for both barrier over-ride and under ride conditions.

Other Aspects

Another advantage of the described gusset is that the material requirements are less than required for a gusset that is entirely rigid. For example a plate thickness of 3.2 millimeters was used for a representative manufactured gusset. Unlike parts designed not to bend, the thickness may be reduced. A non-bending gusset may for example be 6 millimeters in thickness. The use of a lower thickness both allows less material to be used, reducing cost and weight, and also facilitates the bending of the gusset under impact. This is a surprisingly advantageous feature as the bending of the gusset then presents a vertical face towards the impacting barrier. Hence, by using less material, a safer gusset is provided, which is a surprising result.

In examples above, the gusset is described as being formed from two steel plates welded together, in some examples with an optional collar attached. However the gusset may be formed from one or more metal or non-metal components, such as metal plates, molded or cast metal parts, or other components, according to desired manufacturing practices.

The metal may be steel, other ferrous alloy, or non-ferrous alloy such as an aluminum alloy. In some examples, the composition may be non-uniform, for example being formed from plates of differing compositions. In some examples, a gusset may be formed from a strong polymer material that may deform under crash impact.

In some examples, the first plate may be a bent steel plate having one or more holes (apertures) for attachment to the lower back panel and bumper bracket, and a downwardly extending angled portion. The second plate may have two side portions connected by a horizontal bridging portion or top portion. The top portion may have one or more holes facilitating attachment to the rear side member. The downwardly facing side portions of the second plate may have an angled edge to which the angled portion of the first plate may be welded.

An example bumper assembly includes a bumper reinforcement having first and second ends, each end of the bumper reinforcement being attached to a bumper reinforcement bracket, each bumper reinforcement bracket being attached to a gusset according to an example of the present invention. The gusset has a first attachment portion attached to the bumper reinforcement bracket and the lower back panel, and a second attachment portion that attaches to a rear side member. Viewed from the rear, the vehicle may have first and second gussets, a first gusset being attached to a left hand bumper reinforcement bracket and a left rear side member, a second gusset being attached to a right hand bumper reinforcement bracket and a right rear side member. The vehicle may be a land vehicle, such as an automobile, truck, or similar. An attachment may include a nut, bolt, rivet, plug, screw, snap-in component, or other mechanical attachment.

A method of improving vehicle safety during a rear impact to the vehicle by an impactor where the vehicle has a bumper assembly including a bumper reinforcement bracket, a lower back panel and a rear side member, includes attaching the bumper reinforcement bracket to both the lower back panel and to the rear side member of the vehicle using a gusset. The additional attachment to the rear side member, compared with attaching the bumper assembly only to the lower back panel, provides significant safety advantages. The gusset may be configured to present an angled surface to the impactor as the impactor approaches the vehicle, a bend point in the side member and the gusset being configured so that an initial rear impact by the impactor bends the rear side member to reorient the angled surface of the gusset to a vertical orientation, so as to improve the vehicle safety during the rear impact.

The angled portion of the gusset and the first and second bend points may be configured so that a rear impact to the vehicle triggers the first and second bend points sequentially when the gusset attaches the bumper reinforcement bracket to the lower back panel and to the rear side member. In some cases, as discussed above, the first bend point is triggered first, and then the second bend point is triggered. In other cases, the second bend point is triggered first, and then the first bend point is triggered. In this context, a triggered bend point is one about which a bend of the rear member has occurred.

The invention is not restricted to the illustrative examples described above. Examples described are not intended to limit the scope of the invention. Changes therein, other combinations of elements, alternative configurations, and other applications will occur to those skilled in the art.

Having described our invention, we claim:

1. An apparatus for attaching a rear bumper assembly to a vehicle, the rear bumper assembly including a bumper reinforcement bracket, the vehicle having a rear side member and a lower back panel, the apparatus including:

a first attachment portion, the first attachment portion being configured to attach to the bumper reinforcement bracket and the lower back panel;

an angled portion, the angled portion extending from below the first attachment portion at an angle to the first attachment portion, the angled portion presenting an angled surface to the rear of the vehicle;

a second attachment portion, configured to attach to the rear side member of the vehicle, a pair of side portions, the second attachment portion extending between and interconnecting the pair of side portions, each side portion extending downwardly from the second attachment portion and having an angled edge adjacent the angled portion, the apparatus being a metal gusset attaching the bumper reinforcement bracket to the lower back panel and to the rear side member.

2. The apparatus of claim 1, wherein the angle between the angled portion and the first attachment portion being between 10 degrees and 60 degrees.

3. The apparatus of claim 2, wherein the angle being between 20 degrees and 40 degrees.

4. The apparatus of claim 1, wherein the angled portion and first attachment portion being formed from a first metal plate, the second attachment portion and the pair of side portions being formed from a second metal plate, the second metal plate being welded to the first metal plate.

5. The apparatus of claim 1, wherein the rear side member having first and second bend points, the first bend point being closer to the rear bumper assembly than the second bend point, the angled portion of the gusset and the first and second bend points being configured so that a rear impact to the vehicle triggers the first and second bend points sequentially.

6. An apparatus for attaching a rear bumper assembly to a vehicle, the rear bumper assembly including a bumper reinforcement bracket, the vehicle including a rear side member and a lower back panel, the apparatus including:

a first metal plate, the first metal plate including a first attachment portion configured to attach the apparatus to the bumper reinforcement bracket and to the lower back panel; and a second metal plate, the second metal plate including a second attachment portion and a pair of side portions, the second attachment portion including a second attachment point configured to attach the apparatus to the rear side member of the vehicle, the pair of side portions being interconnected by the second attachment portion, each side portion having an edge adjacent the first plate, the first and second plates being welded together along the edge of each side portion, the apparatus being a gusset for attaching the bumper reinforcement bracket to the lower back panel and to the rear side member.

7. The apparatus of claim 6, wherein the first attachment portion including an attachment hole configured to receive a mechanical attachment between the bumper reinforcement bracket, the first attachment portion, and the lower back panel, the second attachment portion including a mounting hole configured to receive a mechanical attachment between the second attachment portion and the rear side member.

8. The apparatus of claim 6, wherein the first and second metal plates each being a steel plate.

9. The apparatus of claim 6, wherein
the first metal plate further including an angled portion, the angled portion extending from the attachment portion, the angled portion presenting an oblique surface to a rear impactor,
the first metal plate having a bend angle between the angled portion and the first attachment portion, the bend angle being between 10 degrees and 60 degrees.

10. The apparatus of claim 9, wherein the bend angle being between 20 degrees and 40 degrees.

11. The apparatus of claim 9, wherein the first and second metal plates being welded to each other, a weld extending between the angled edge of each side portion and the angled portion of the first plate.

12. The apparatus of claim 9, wherein the rear side member having first and second bend points, the first bend point being closer to the rear bumper assembly than the second bend point,
the angled portion of the gusset being configured so that a rear impact to the vehicle triggers the first and second bend points sequentially when the gusset attaches the bumper reinforcement bracket to the lower back panel and to the rear side member.

13. A method of improving vehicle safety during a rear impact to a vehicle by an impactor, the vehicle having a bumper assembly including a bumper reinforcement bracket, a lower back panel and a rear side member, the method including:
attaching the bumper reinforcement bracket to both the lower back panel and to the rear side member of the vehicle using a gusset,
the attachment of the bumper reinforcement bracket to both the lower back panel and to the rear side member of the vehicle improving vehicle safety during a rear impact,
the gusset having a first metal plate and a second metal plate,
the first metal plate including a first attachment portion configured to attach the gusset to the bumper reinforcement bracket and to the lower back panel,
the second metal plate including a second attachment portion and a pair of side portions, the second attachment portion including a second attachment point configured to attach the gusset to the rear side member of the vehicle, the pair of side portions being interconnected by the second attachment portion, each side portion having an edge adjacent the first metal plate,
the first and second metal plates being welded together along the edge of each side portion.

14. The method of claim 13, wherein the gusset presenting an angled surface to the impactor as the impactor approaches the vehicle, the method further including:
providing at least one bend point in the rear side member, the bend point and the gusset being configured so that an initial rear impact by the impactor bends the rear side member to reorient the angled surface of the gusset to a vertical orientation, so as to improve the vehicle safety during the rear impact.

15. The method of claim 13, wherein the gusset presenting an angled surface to the impactor as the impactor approaches the vehicle, the rear side member having first and second bend points, the first bend point being closer to the gusset.

16. The method of claim 15, wherein the first and second bend points and the angled portion of the gusset being configured so that the rear impact initially triggers the first bend point and then triggers the second bend point.

17. The method of claim 15, wherein the first and second bend points and the angled portion of the gusset being configured so that the rear impact initially triggers the second bend point and then triggers the first bend point.

18. The method of claim 13, wherein the vehicle including a left rear side member, a left bumper reinforcement bracket, a right rear side member, and a right bumper reinforcement bracket, the gusset being a first gusset,
the bumper assembly having a left end portion including the left bumper reinforcement bracket and a right end portion including the right bumper reinforcement bracket,
the method including attaching the left end portion to the lower back panel and the left rear side member using the first gusset, and
attaching the right end portion to the lower back panel and the right rear side member using a second gusset.

* * * * *